(12) United States Patent
Brown (10) Patent No.: US 11,629,799 B2
(45) Date of Patent: Apr. 18, 2023

(54) CABLE MANAGEMENT DEVICE

(71) Applicant: Nathan M. Brown, Cleveland, MN (US)

(72) Inventor: Nathan M. Brown, Cleveland, MN (US)

(73) Assignee: Johnson Outdoors Inc., Racine, WI (US)

(*) Notice: Subject to any disclaimer, the term of this patent is extended or adjusted under 35 U.S.C. 154(b) by 0 days.

(21) Appl. No.: 17/468,074

(22) Filed: Sep. 7, 2021

(65) Prior Publication Data

US 2023/0070017 A1    Mar. 9, 2023

(51) Int. Cl.
  *F16L 3/127*   (2006.01)
  *F16L 3/24*    (2006.01)
  *F16L 3/137*   (2006.01)
  *F16L 3/12*    (2006.01)

(52) U.S. Cl.
  CPC .............. *F16L 3/127* (2013.01); *F16L 3/1211* (2013.01); *F16L 3/137* (2013.01); *F16L 3/245* (2019.08)

(58) Field of Classification Search
  CPC ......... F16L 3/127; F16L 3/245; F16L 3/1211; F16L 3/137
  See application file for complete search history.

(56) References Cited

U.S. PATENT DOCUMENTS

| | | | | |
|---|---|---|---|---|
| 2,689,995 | A * | 9/1954 | Smith | B01L 9/50 285/410 |
| 3,650,545 | A * | 3/1972 | Freed | B60D 1/62 280/421 |
| 4,358,082 | A * | 11/1982 | Reeves | B60D 1/62 248/68.1 |
| 8,142,083 | B2 * | 3/2012 | Brown | F16M 11/2035 396/421 |
| 8,943,991 | B2 * | 2/2015 | Snow, Jr. | B63B 34/60 248/65 |
| 2012/0099851 | A1 * | 4/2012 | Brown | F16M 11/18 396/421 |
| 2018/0335167 | A1 * | 11/2018 | Qi | F16L 3/1211 |
| 2021/0362818 | A1 * | 11/2021 | Ridl | B63H 20/12 |

* cited by examiner

*Primary Examiner* — Christopher Garft
(74) *Attorney, Agent, or Firm* — Reinhart Boerner Van Deuren P.C.

(57) ABSTRACT

A cable management device for managing cables of a trolling motor is provided. The cable management device can slide axially along a shaft of a trolling motor while being affixed to a portion of a cable of the trolling motor. A trolling motor including such a cable management device is provided.

18 Claims, 12 Drawing Sheets

CABLE MANAGEMENT DEVICE

FIELD OF THE INVENTION

This invention generally relates to trolling motors and particularly management of cables of a trolling motor.

BACKGROUND OF THE INVENTION

Trolling motors are used to steer or otherwise position a watercraft within a body of water. The trolling motor has a propulsion unit that is typically steerable. To provide, among other things, control signals, power, and data, trolling motors typically have one or more cables. Some cables extend between one end of a shaft of the trolling motor and a trolling motor mount.

Trolling motors are typically stowable and deployable relative to the watercraft. In a stowed configuration, the propulsion unit is out of the water. In a deployed configuration, the propulsion unit is located within the water. Further yet, most trolling motors have the propulsion unit attached to a shaft that can be raised and lowered to adjust the depth of the propulsion unit as well as to allow for more convenient stowing of the trolling motor.

Unfortunately, as the trolling motor shaft is translated relative to the trolling motor mount either for stowing/deploying or adjusting the depth within the water, the cables of the trolling motor can become bunched up as well as can interfere with the translation of the shaft of the trolling motor. As the length of the trolling motor shaft increases, the length of the associated cables also increases further exacerbating the bunching of the cables when the shaft is lowered relative to the trolling motor mount.

Examples of the disclosure provide improvements over the current state of the art and provide improvements in managing the cables of the trolling motor, particularly when the trolling motor propulsion unit is fully deployed.

BRIEF SUMMARY OF THE INVENTION

Examples of the application provide a new and improve cable management device for managing at least one cable of a trolling motor. In some examples, the cable management device prevents or limits at least one cable of the trolling motor from interfering with axially translating a shaft of the trolling motor relative to a trolling motor mount. In some examples, the cable management device prevents excessive or significant sagging of at least one cable of the trolling motor when the trolling motor shaft is fully deployed In an example, a cable management device for a trolling motor having a trolling motor mount, a shaft extending axially between first and second ends, the shaft being adjustably positionable relative to the trolling motor mount, a propulsion unit attached to the first end of the shaft, and at least one cable extending to the second end of the shaft is provided. The cable management device includes a mounting base and a cable attachment. The mounting base is configured to slidably attach to the shaft for movement along the shaft along an axis. The cable attachment is operably connected to the mounting base. The cable attachment is configured to attach to the at least one cable. The cable attachment is laterally offset from the mounting base and spaced away from the first axis.

In one example, the mounting base is configured to rotate around the axis when mounted to the shaft such that the mounting base has at least two degrees of freedom relative to the shaft.

In one example, the cable attachment is connected to the mounting base for pivotal movement about a second axis that is generally perpendicular to the first axis to provide a third degree of freedom to the cable attachment relative to the axis.

In one example, the mounting base is a rigid support ring that defines an aperture through which the shaft can extend. The cable attachment includes an arm extending between a mounting end that is connected to the mounting base and an attachment end that includes a cable connector through which the at least one cable extends to attach the cable attachment to the at least one cable.

In one example, the support ring can slide axially along the shaft and rotate about the shaft. The arm is pivotally connected to the mounting base about a second axis that is generally perpendicular to the first axis. The cable connector can rotate relative to the arm, such as about an axis that is generally perpendicular to the second axis.

In one example, the second axis intersects the first axis. This limits the amount of torque about the second axis, if any that can be applied to the shaft, when mounted thereto.

In one example, the mounting end includes a yoke that is pivotably attached to the mounting base on opposed sides of the mounting base.

In one example, the cable attachment includes a clip that extends completely around the at least one cable.

In an example, a trolling motor includes a trolling motor mount, a shaft, propulsion unit, at least one cable, and a cable management device as outlined above. The shaft is carried by the trolling motor mount. The shaft extends axially between first and second ends. The shaft is adjustably positionable relative to the trolling motor mount along a shaft axis. The propulsion unit is attached to the first end of the shaft. The at least one cable is attached proximate the second end of the shaft. This may be to a control head, other component, or the shaft itself. The cable management device is mounted between the second end of the shaft and the trolling motor mount. The mounting base is slidable along the shaft to adjust a position of the mounting base between the second end and the trolling motor mount. The cable attachment attached to the at least one cable.

The attachment to the at least one cable helps maintain the portion of the at least one cable attached to the cable management device at a particular position relative to the shaft.

In one example, the cable management device spaces at least a region of the at least one cable proximate the attachment of the cable attachment to the at least one cable from the shaft.

In one example, the first axis is parallel to the shaft axis.

In one example, the mounting base of the cable management device is rotatable relative to the shaft about the shaft axis.

In one example, the cable attachment is pivotable relative to the shaft and the mounting base about a second axis that is perpendicular to the shaft axis.

In one example, the cable attachment includes an arm extending between a mounting end that is connected to the mounting base and an attachment end that is operably attached to the at least one cable such that the at least one cable is fixed relative to the attachment end when the mounting base moves axially along the shaft. The cable may rotate within the cable attachment, but not move under normal operating forces axially within the cable attachment.

In one example, the shaft is axially slidable along the shaft axis at least 40 inches and the mounting base is axially slidable at least 20 inches along the shaft axis.

In one example, the at least one cable includes at least one coiled cable and at least one uncoiled cable. The cable attachment directly connects to the at least one coiled cable, the at least one uncoiled cable, or both the at least one coiled cable and the at least one uncoiled cable.

In one example, the trolling motor mount includes a steering mechanism. The steering mechanism is configured to rotate the shaft about the shaft axis. The shaft is axially slidable relative to the steering mechanism.

In an example, a method of managing at least one cable of a trolling motor is provided. The method includes axially sliding a cable management device mounted to a shaft of the trolling motor along the shaft of the trolling motor while axially translating the shaft of the trolling motor relative to a trolling motor mount. The cable management device is attached to at least one cable of the trolling motor with a second end of the cable management device at a location between ends of the at least one cable. Axially sliding the cable management device along the shaft of the trolling motor axially translates a portion of the at least one cable axially relative to the shaft with the cable management device.

In one example, the method includes rotating the cable management device about the shaft of the trolling motor. Wherein rotating the cable management device about the shaft of the motor rotates the portion of the at least one cable angularly about the shaft. This can be accomplished by limiting rotation of the cable management device while rotating the shaft of the trolling motor.

In one example, the method includes pivoting an arm of the cable management device relative to a mounting base of the cable management device to which the arm is mounted about an axis that is generally perpendicular to the shaft of the trolling motor by translating the shaft of the trolling motor relative to the trolling motor mount.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
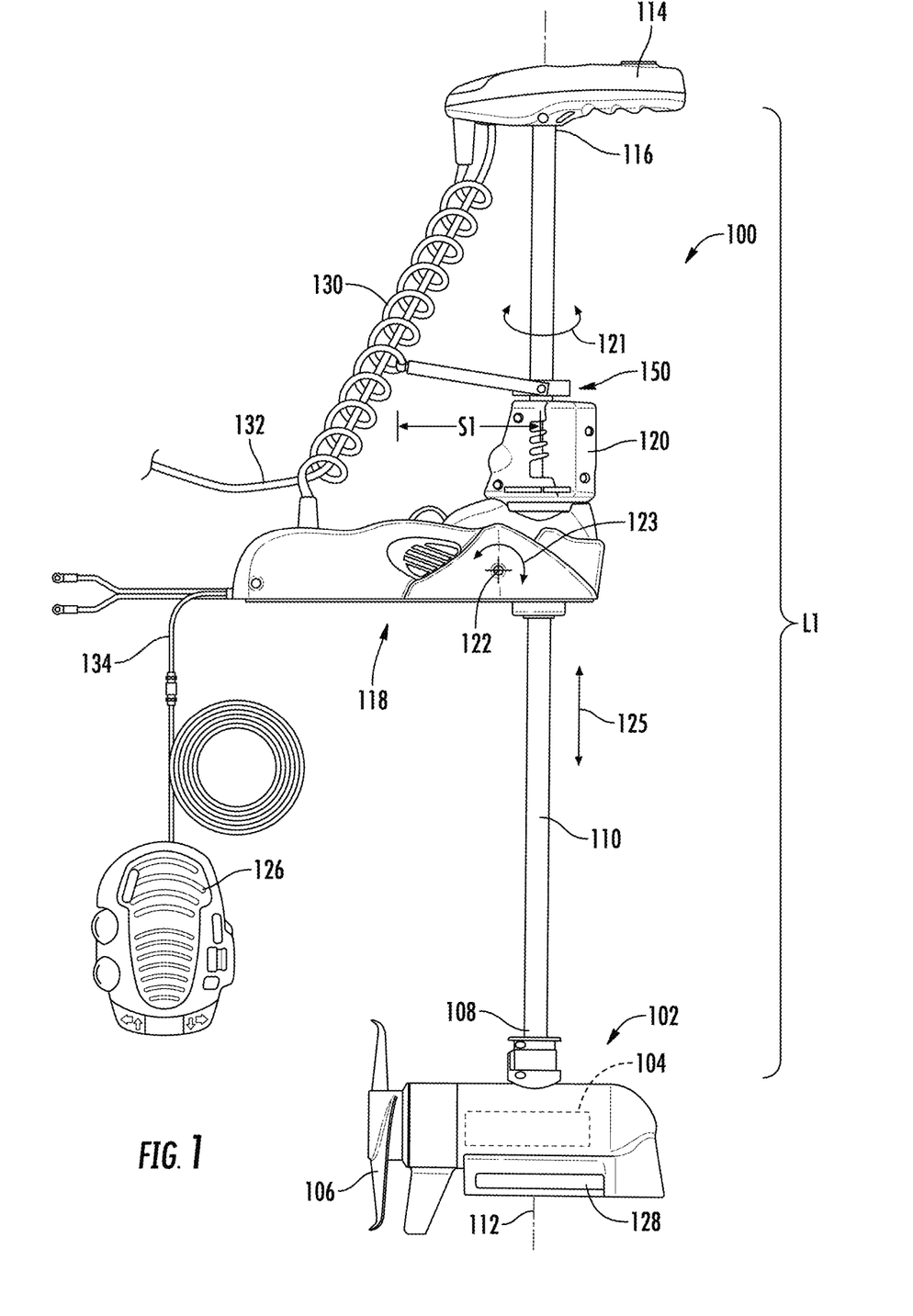
FIG. 1 is a plan view of a trolling motor according to an example of the application, with the shaft at an intermediate position relative to the trolling motor mount.

FIG. 1 illustrates a trolling motor 100 according to an example of the present application. The trolling motor 100 is generally configured to be mounted to a watercraft, such as the bow of the watercraft, and is used to steer or otherwise position the watercraft within a body of water.

The trolling motor 100 generally includes a propulsion unit 102 that, in this example, includes an electric motor 104 and propeller 106 to steer and maneuver the watercraft. The propulsion unit 102 is attached at a first end 108 of a shaft 110 that defines a shaft axis 112. A control head 114 is mounted to a second end 116 of the shaft 110.

A trolling motor mount 118 is used to mount, generally, the trolling motor 100 to the watercraft. In this example, the trolling motor mount 118 includes a steering unit 120 that includes a motor and appropriate gearing used to electrically rotate the shaft 110 and, consequently, propulsion unit 102 and control head 114 about shaft axis 112 (illustrated by arrow 121). Preferably, the steering unit 120 can rotate the shaft 110 more than 360 degrees about shaft axis 112 to provide sufficient range of motion for steering operations.

The motor mount 118, in this example, is configured to pivot the steering unit 120 about axis 122, e.g. approximately 90 degrees (illustrated by arrow 123), for stowing the propulsion unit 102. The shaft 110 is axially positionable relative to the trolling motor mount 118 (illustrated by arrow 125 and FIGS. 2 and 3), such as to allow adjusting the depth of the propulsion unit 102 as well as to assist in stowing the shaft 110, propulsion unit 102 and control head 114.

The motion illustrated by arrows 121, 123 and 125 could be controlled manually, electromechanically or a combination thereof. For example, vertical adjustment illustrated by arrow 125 may be performed fully manually by the user while rotation illustrated by arrow 121 could be done fully electromechanically, e.g. by pressing a button or pedal. In some examples, the motion illustrated by arrows 121, 123, 125 could all be electromechanical such that it can be performed without any force input by a user. Alternatively, in some examples, some motion could be electromechanical while other motion is manual. For example, in some known trolling motors, the motion illustrated by arrows 123 and 125 is performed manually while the motion illustrated by arrow 121 is electromechanical.

An input device, illustrated in this example in the form of a foot pedal 126, is used to provide control signals from the user to the steering unit 120 and the propulsion unit 102. For example, the user can turn on and off the propulsion unit as well as to steer the shaft 110 and consequently propulsion unit 102 by way of foot pedal 126. In other examples, remote controls or other devices such as fish finders can be used to input controls that are provided by the foot pedal 126 in this illustrated example.

The propulsion unit 102 of the illustrated example includes a built in transducer 128 used in conjunction with a fish finder to provide sonar imaging of objects within the water, such as vegetation, structure, the floor of the body of water, rocks, fish etc.

The trolling motor 100 in this example includes a plurality of cables including a coiled cable 130 as well as an uncoiled cable 132. In this example, the uncoiled cable passes through the center of the coiled cable 130. The coiled cable 130 extends between and has fixed connections with a base member 134 of the trolling motor mount 118 and the control head 114. In this example, the uncoiled cable also runs to a fixed connection with the control head 114. The uncoiled cable does not extend into or is not otherwise directly connected to the trolling motor mount 118. While both coiled and uncoiled cables are illustrated, other examples could use solely coiled or solely uncoiled cables.

In this example, a cable 134 extends between the trolling motor mount 118 and the foot pedal 126. In other embodiments, the foot pedal 126, or other input device such as a remote, smart phone app, fish finder, etc., could wirelessly communicate with the rest of the trolling motor or communicate over an Ethernet network.

The cables 130, 132 can carry data, control and/or power signals for controlling and powering activation of the propulsion unit 102 and/or transducer 128 as well as communicating sonar imaging data and control information. In some examples, cables extend within the shaft 110 between the control head 114 and the propulsion unit 102 and transducer 128.

In some examples, the length L1 of the shaft 110 between the first and second ends 108, 116 can be greater than 40 inches, greater than 60 inches, greater than 80 inches and in some implementations greater than 100 inches. As such, to accommodate longer and longer shafts 110, the cables 130, 132 must be longer and longer.

Figure 2:
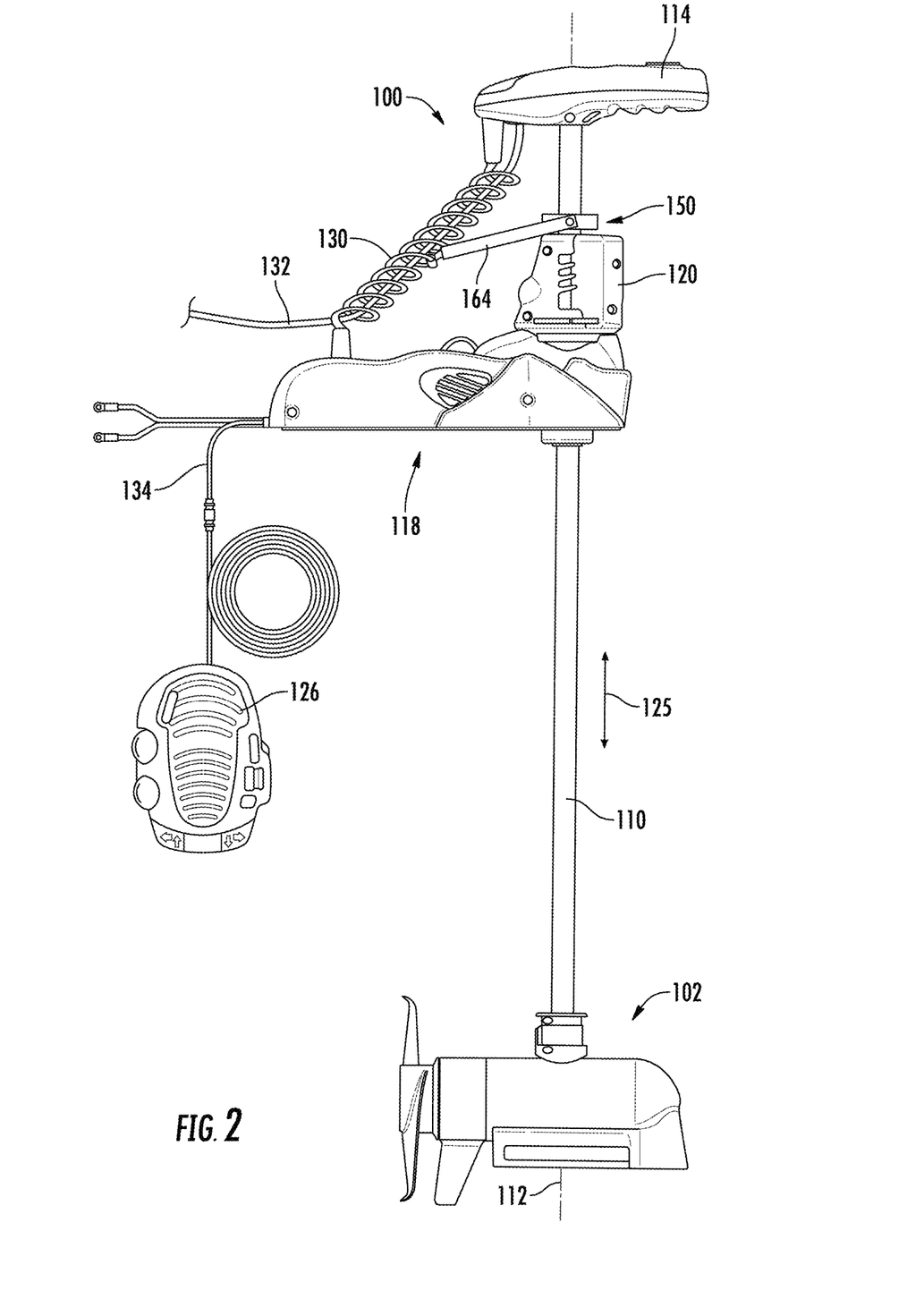
FIG. 2 is a plan view of the trolling motor of FIG. 1 with the shaft fully deployed.

As the trolling motor 100 is lowered (see e.g. FIG. 2) relative to the trolling motor mount 118, the cables 130, 132 can bunch up and can interfere with the motion of the shaft 110 (e.g. rotational motion about shaft axis 112 as illustrated by arrow 121). Further, the bunched cables 130, 132 can interfere with fully lowering the shaft 110 along shaft axis 112 as the cables can get lodged between the control head 114 and the trolling motor mount 118 interfering with fully deploying the propulsion unit into the water. This could also lead to damage to the cables 130, 132. Further yet, as the cables 130, 132 get longer and longer when the trolling motor is in the configuration illustrated in FIG. 2, the bunched up cables 130, 132 can hang down a significant distance resulting in possible damage to the cables. This is due in part to the connection points for the cables 130, 132 become significantly close to the trolling motor mount 118 when the shaft 110 is lowered as illustrated in FIG. 2.

As such, a cable management device 150 is used to, at least in part, control or otherwise manage the positioning of the cables 130, 132 relative to shaft 110 and/or trolling motor mount 118 when the shaft 110 is rotated about shaft axis 112 relative to trolling motor mount 118 or translated axially along shaft axis 112 relative to trolling motor mount 118. In particular, the cable management device 150 is mounted to the trolling motor shaft 110 and attached to one or more of cables 130, 132 to maintain the lateral spacing S1 between a portion of the cables 130, 132 and shaft 110 as well as to prevent significant sagging of the cables 130, 132 depending on the position of the shaft 110.

Figure 4:
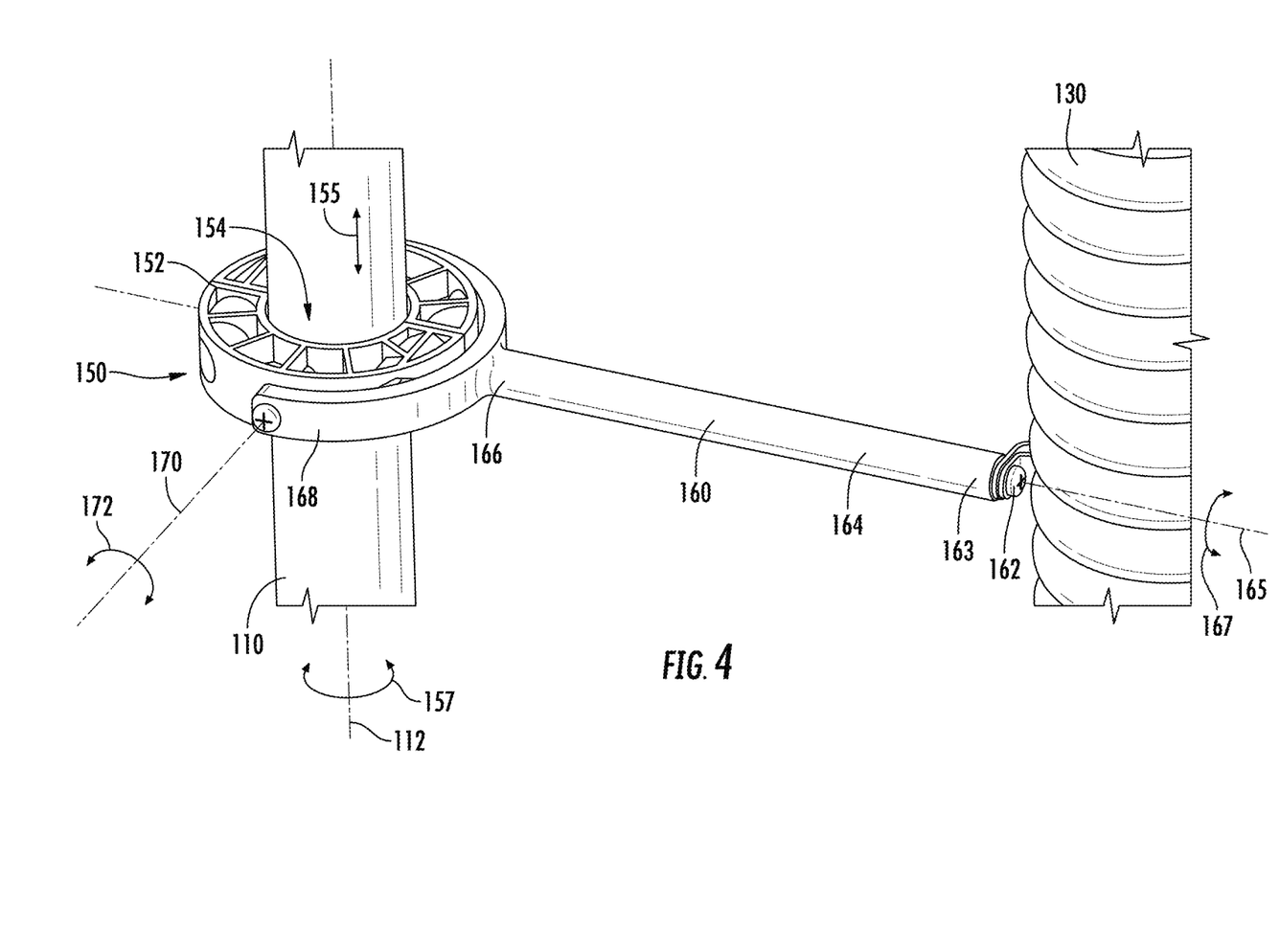
FIG. 4 is an enlarged perspective illustration of a cable management device of the trolling motor of FIG. 1.

With reference to FIG. 4, the cable management device 150 includes a mounting base 152 that mounts the cable management device 150 to shaft 110. The mounting base 152 defines an aperture 154 through which shaft 110 extends and the mounting base 152 extends fully around shaft 110. The aperture defines a mounting axis that is generally coaxial with axis 112, when mounted. The mounting base 152 need not, in other embodiments, extend fully around the shaft 110 and could be C-shaped or otherwise configured to mount to shaft 110.

In this example, the aperture 154 is sized and shaped to allow the mounting base 152 to slide axially along shaft 110 and shaft axis 112 (see e.g. arrow 155) as well as to rotate angularly about shaft 110 and shaft axis 112 (see e.g. arrow 157). In this example, the mounting base 152 can rotate completely around shaft 110. It is contemplated that in some examples, the mounting base 152 only slides axially along the shaft 110 and has limited (less than 40 degrees) to no ability to rotate about the shaft axis 112.

Figure 3:
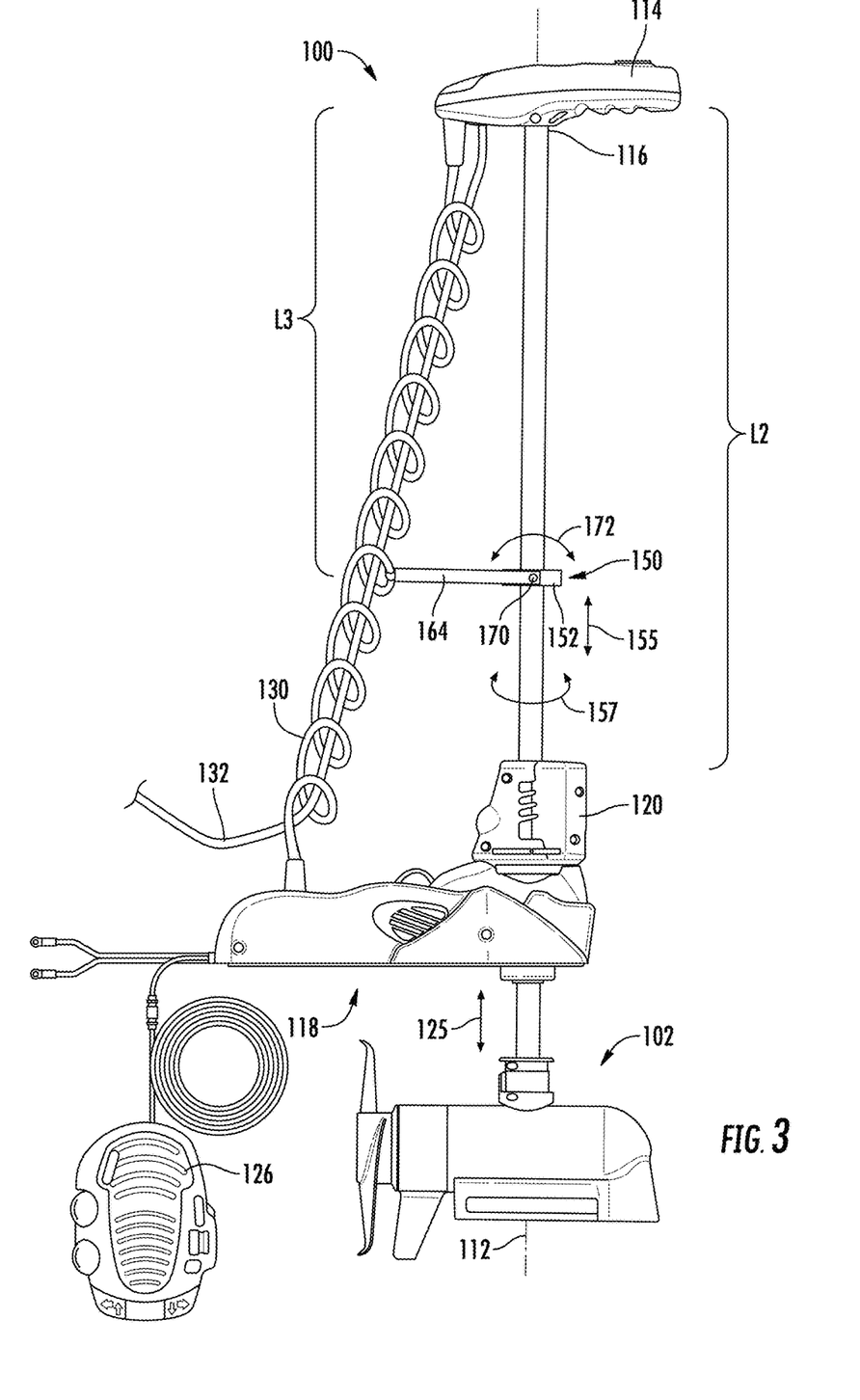
FIG. 3 is a plan view of the trolling motor of FIG. 1 with the shaft fully vertically retracted.

In some examples and with reference to FIG. 3, the shaft 110 is allowed to slide a length L2 of at least 40 inches along axis 112 relative to trolling motor mount 118 and the cable management device 150 slides along axis 112 relative to shaft 110 a length L3 of at least 20 inches. The cable management device 150 could slide the entire length of the portion of the shaft between control head 114 and trolling motor mount 118, however, in practice the attachment to the cables 130, 132 prevents a full amount of axial motion along shaft 110. Typically, the cable management device 150 will be attached approximately halfway between the connection portions of the cable with the trolling motor mount 118 and control head 114.

When the shaft 110 is moved downward such that the control head 114 is moved towards the trolling motor mount 118 (e.g. from its position in FIG. 1 to its position in FIG. 2), the connection of the cable management device 150 to the cables 130, 132 and/or force applied by the control head 114 causes the cable management device 150, and particularly the mounting base 152, to slide up relative to shaft 110 toward end 116. Similarly, when the shaft 110 is moved upward such that the control head 114 is moved away from the trolling motor mount 118 (e.g. from its position in FIG. 1 to its position in FIG. 3), the connection of the cable management device 150 to the cables 130, 132 causes the cable management device 150, and particularly the mounting base 152, to slide down along shaft 110 towards end 108. During upward or downward directed motion, the cable management device 150 laterally spaces the cables 130, 132 from the shaft 110.

In addition to sliding along shaft 110, in some examples, the mounting base 152 may rotate about shaft 110 and shaft axis 112. This occurs when the shaft 112 has rotated sufficiently far that sufficient torque is applied to the cable management device 150 by the cables 130, 132.

The cable management device 150 includes a cable attachment 160 operably connected to the mounting base 152 and operably attached to the cables 130, 132. The cable attachment 160 provides the lateral spacing S1. In this example, the cable attachment 160 includes a cable connector in the form of an attachment clip 162 that operably engages one or both of cables 130, 132. The attachment clip 162 is attached to an attachment end 163 of an arm 164. In an embodiment, the clip 162 is capable of rotating about clip axis of rotation 165 as illustrated by arrow 167. A mounting end 166 of the arm 164 includes a yoke 168 that operably attaches the arm 164 to mounting base 152.

In this example, the yoke 168 extends around and receives a portion of the mounting base 152. Further, the yoke 168 is pivotally attached to the mounting base 152 on opposed sides of the mounting base 152 to permit pivotal motion between the arm 164 and the mounting base 152 about axis 170, illustrated by arrow 172. This pivotal attachment prevents or limits binding between the shaft 110 and the mounting base 152 when the mounting base 152 slides along shaft 110. In a preferred example, as illustrated in FIG. 4, axis 170 is perpendicular to and extends through shaft axis 112 to further reduce or limit binding between the shaft 110 and the mounting base 152. With axis 170 extending through axis 112, substantially no torque about axis 170 is applied to mounting base 152.

In one example, the clip axis of rotation 165 is perpendicular to axis 170.

As such, the cable management device 150 in this example has four degrees of freedom relative to shaft 110 including axial motion along shaft 110 (arrow 155), rotational motion about shaft 110 (arrow 157), pivotal motion about axis 170 (arrow 172), and rotational motion about axis 165.

In this example, the mounting base 152 is a rigid support ring that extends fully around the shaft 110. In particular, the support ring is formed from two separate halves that are secured together with fasteners, such as with screws, bolts, snaps, clips, latches, etc. The fasteners could be incorporated into the two separate halves in some examples. However, as illustrated below, the mounting base 152 can take other forms. For example, the mounting base 152 could be a continuous ring formed from a continuous piece of material, such as for example by way of molding or machining.

In this example, the attachment clip 162 is a P-clip that fully surrounds the cable 130, 132 to which it is attached. The P-clip can be stretched to receive the cable(s) 130, 132 therein and then closed to secure the cable(s) 130, 132 therein. In this example, the clip 162 is attached to the coiled cable 130. However, in other examples, it may be attached to the uncoiled cable 132 or both the coiled and uncoiled cables 130, 132.

In this example, the attachment clip 162 is attached to the end of arm 164 by a screw. However, clip 162 could be integrally formed with the arm 164 or otherwise attached such as by welding, over molding, co-molding, adhesives, etc. Further, other cable connectors are contemplated, such as c-clips, flexible cabling, straps, etc.

Figure 5:
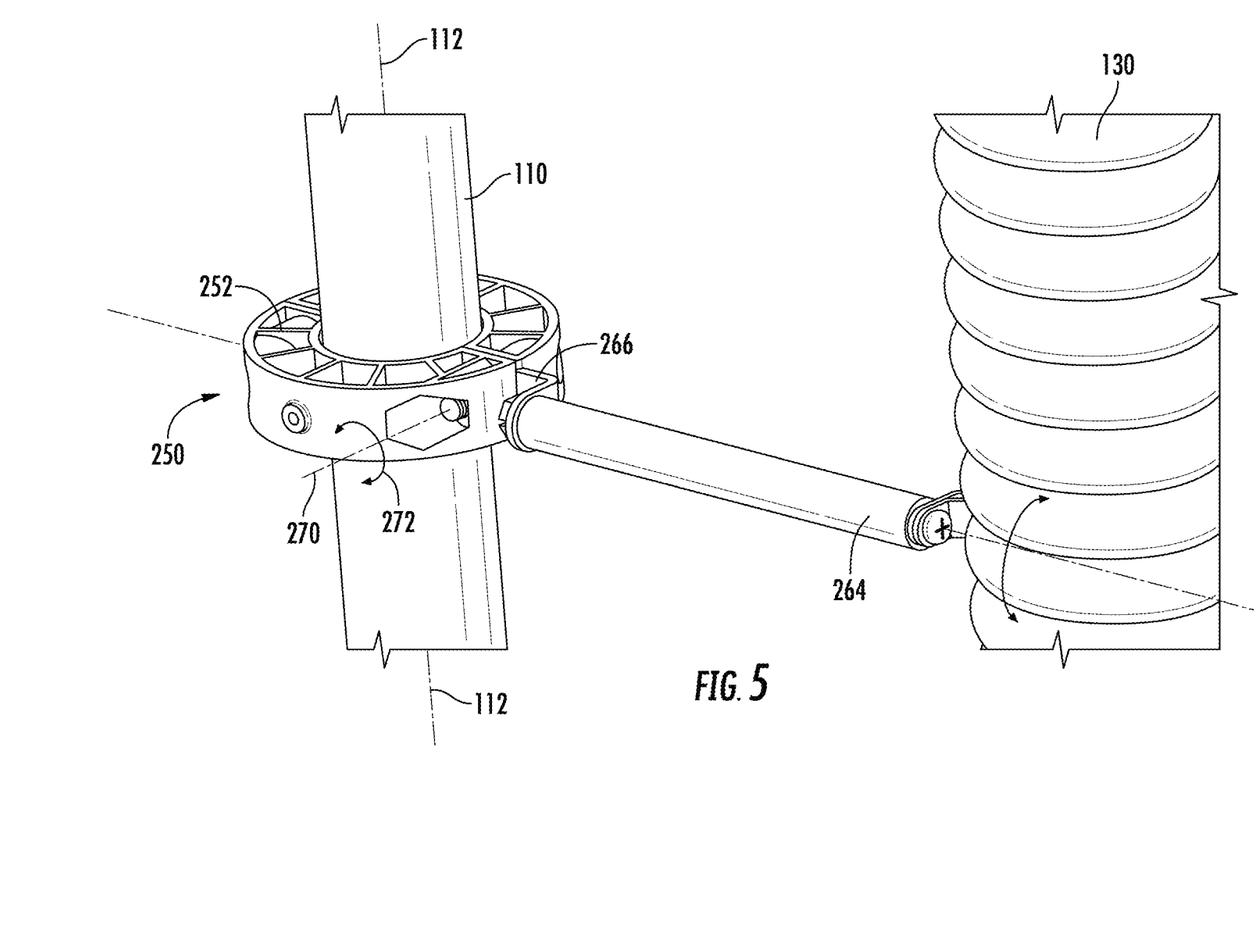
FIG. 5 is an enlarged perspective illustration of an alternative cable management device useable in the trolling motor of FIG. 1.

FIG. 5 illustrates a further example of a cable management device 250. In this example, the mounting base 252 is similar to mounting base 152. However, in this example, the mounting end 266 of arm 264 is sandwiched between the two halves of the mounting base 252. Further, axis 270 is laterally offset from, but perpendicular to, shaft axis 112. While this design provides for pivotal motion about axis 270 (arrow 272), binding between the mounting base 252 and shaft 110 is more likely due to axis 270 not extending through shaft axis 112, e.g. the axis along which the mounting base 252 slides.

Figure 6:
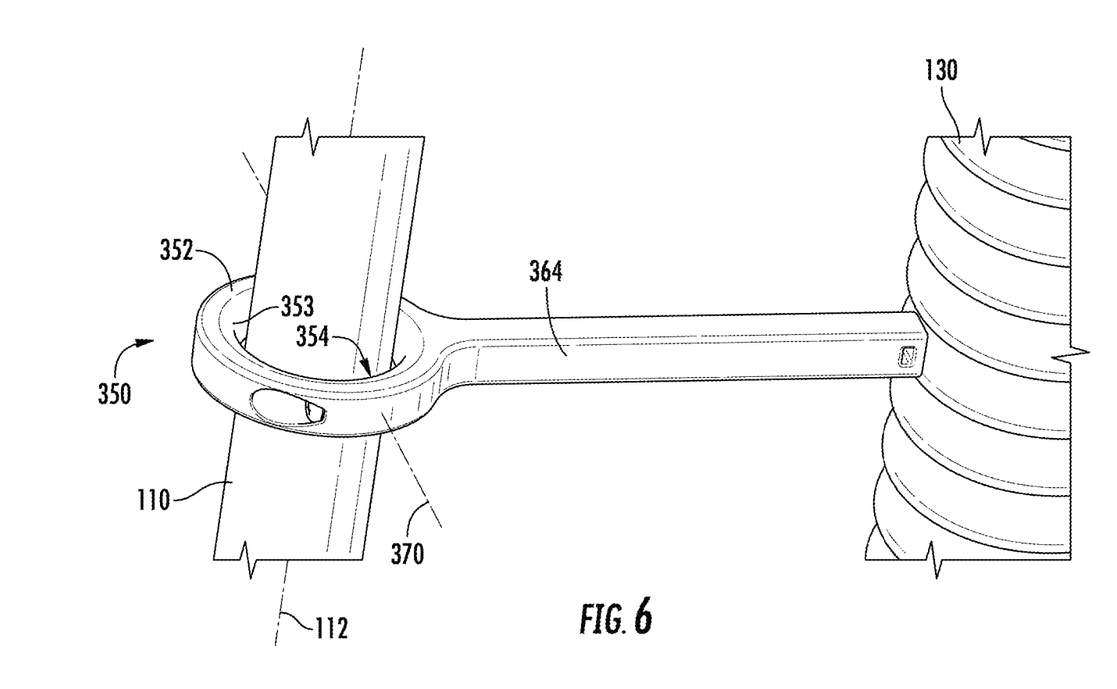
FIG. 6 is an enlarged perspective illustration of an alternative cable management device useable in the trolling motor of FIG. 1.

FIG. 6 illustrates a further example of a cable management device 350. In this example, the mounting base 352 and arm 364 are formed as a unitary component. However, the inner periphery of the aperture 354 is rounded to allow for some degree of freedom about axis 370, which is perpendicular to axis 112. In this example, the mounting base 352 and arm 364 are formed from two components that clamp (but with clearance for permitting sliding, rotating, and pivoting motion) around shaft 110. The cable connector is not provided in FIG. 6, but any mechanism to secure arm 364 to cable 130 could be provided, such as a clip as outlined above or even a strap, hook and loop, cable or a cable tie (e.g. zip tie). In one example, a cable tie that includes a push mount is mounted to the aperture illustrated in the side of the arm 364. Alternatively, the push mount could be mounted into an aperture in the end of arm 364. Mounted in the end as opposed to the side is preferred to provide the rotational degree of freedom similar to rotation about axis 165 can be provided. The push mount could be in the form of a fir tree, one or more resilient tapered arms that resiliently flexes in one direction to allow for insertion but springs back in the opposite direction once sufficiently inserted to oppose removal. Alternatively, the cable tie itself could extend through the aperture. While described with reference to this embodiment, these examples of cable connectors could be applied to the other embodiments described herein.

Figure 7:
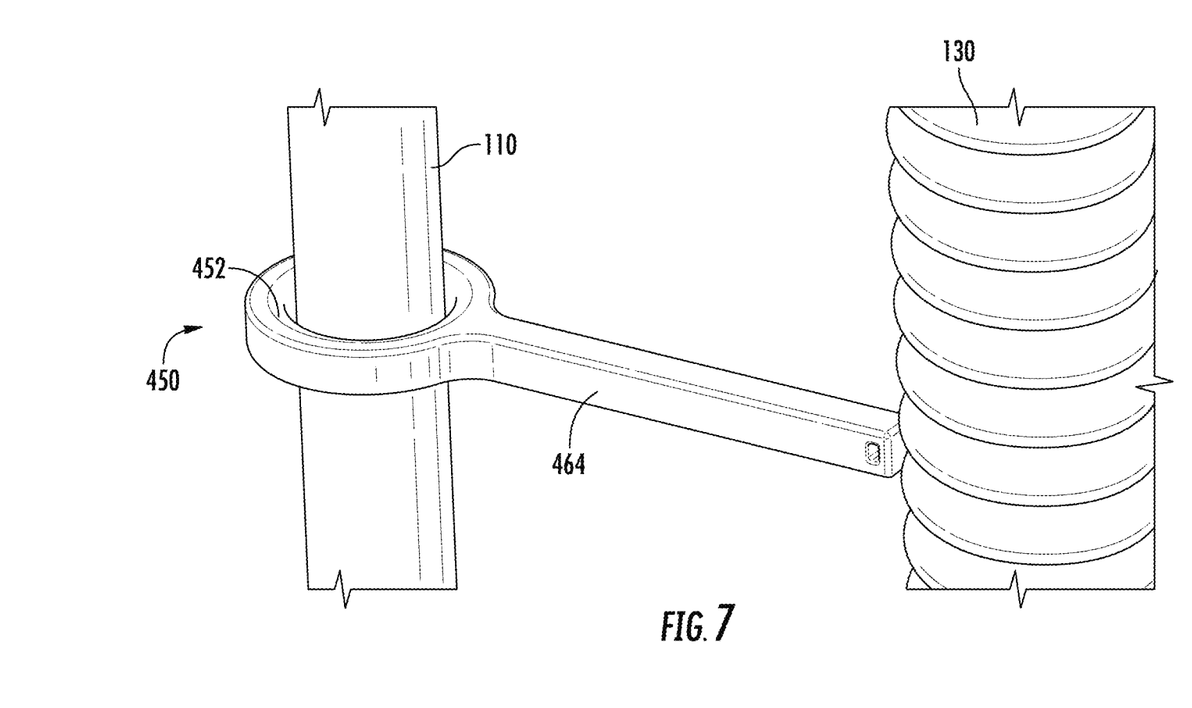
FIG. 7 is an enlarged perspective illustration of an alternative cable management device useable in the trolling motor of FIG. 1.

FIG. 7 illustrates a further example of a cable management device 450. In this example, the mounting base 452 and arm 464 are formed as a single unitary component.

Figure 8:
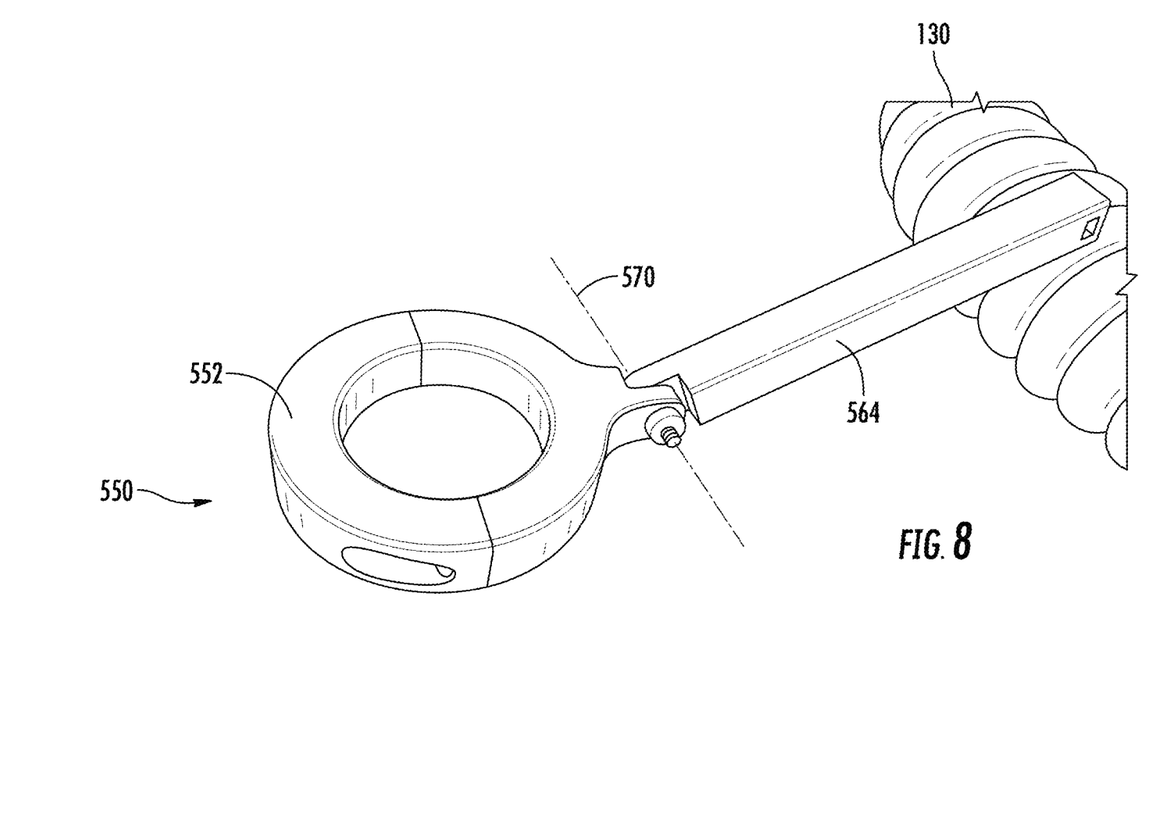
FIG. 8 is an enlarged perspective illustration of an alternative cable management device useable in the trolling motor of FIG. 1.

FIG. 8 illustrates a further example of a cable management device 550. Here, the mounting base 552 is formed from two components that clamp around the shaft 110. The arm 564 is pivotally attached to one of the two components with a pivotal connection that allows for pivoting motion about axis 570 of arm 564. The axis 570 is laterally offset from the shaft axis 112 when mounted to a shaft 110 of trolling motor 100.

Figure 9:
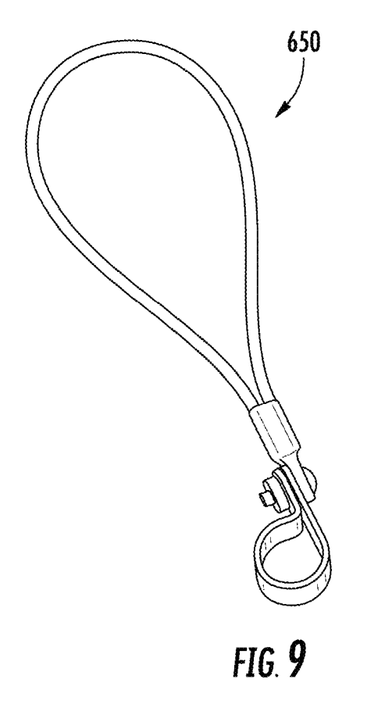
FIG. 9 is a perspective illustration of an alternative cable management device useable in the trolling motor of FIG. 1.
Figure 10:
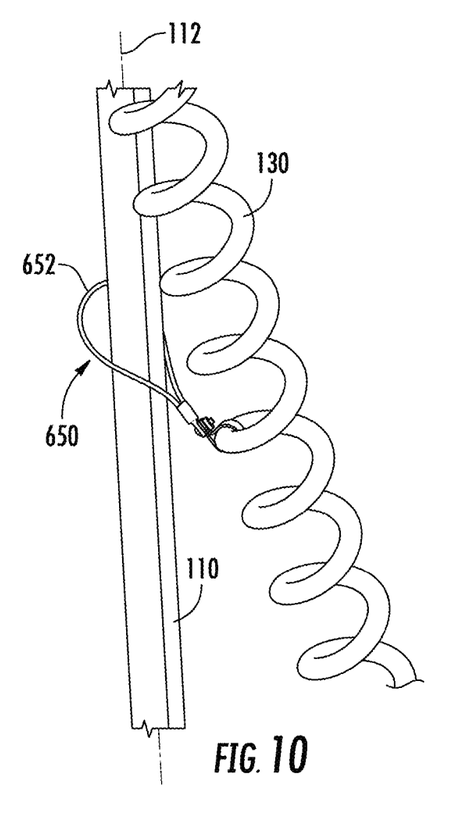
FIG. 10 is a perspective illustration of the cable management device of FIG. 9 attached to a trolling motor shaft.

FIGS. 9 and 10 illustrate a further example of a cable management device 650. In this example, the mounting base 652 is in the form of a flexible strap, which may be a cord, rope, cable, lanyard, tube, wire, etc. that forms a loop that extends around shaft 110. Clip 654 is attached to strap 652. In this embodiment, the cable management device 650 is primarily used to prevent the cable 130 from sagging or otherwise limiting the distance the portion of cable 110 connected to clip 654 can move radially away from shaft 110. The clip 654 is attached to eyelets at the end of strap 652 by a fastener, such as a nut and bolt.

Figure 11:
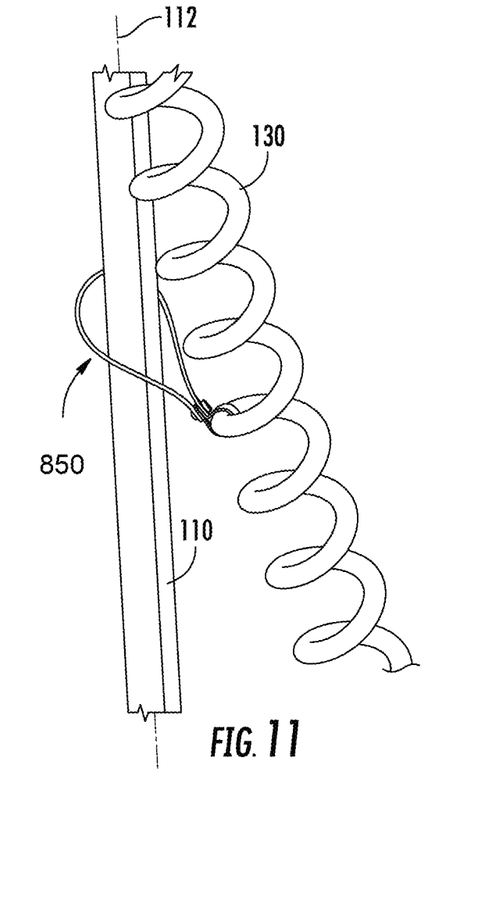
FIG. 11 is a perspective illustration of an alternative cable management device useable in the trolling motor of FIG. 1.
Figure 12:
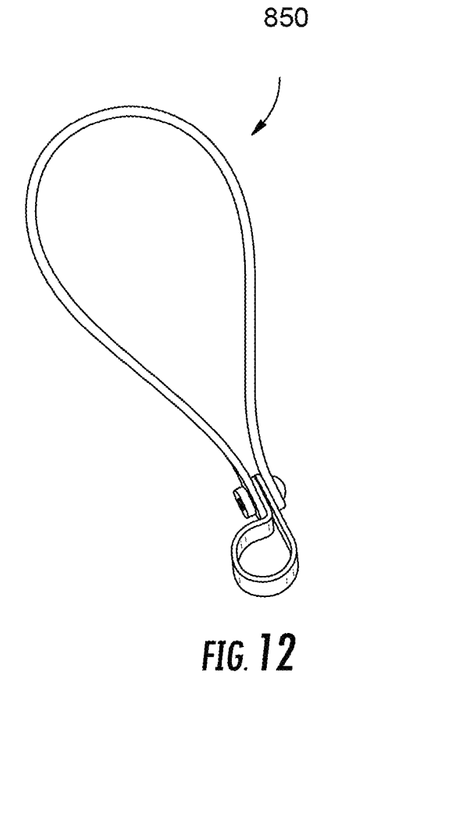
FIG. 12 is a perspective illustration of the cable management device of FIG. 11 attached to a trolling motor shaft.

FIGS. 11 and 12 illustrate a further example, similar to FIGS. 9 and 10 of a cable management device 850. This embodiment uses a nylon cable with eyelets molded thereto. The P-clip is attached to the eyelets at the end of the cable with a fastener, such as a nut and bolt.

In use, the cable management devices limit or maintain spacing between the cables 130, 132 relative to the trolling motor shaft 110. This can be used to prevent interference when lowering the shaft 110 or to prevent the cables from becoming unorganized, such as when the shaft 110 is a fully lowered position (see e.g. FIG. 2). The cable management devices find particular use with heavy gage or otherwise stiff or rigid cables such as heavy duty power cables, data cables, or when numerous cables are used with the trolling motor (e.g. a combination of more than one of a power cable, data cable, control cable, transducer cable, Ethernet cable, etc.).

While the illustrated embodiments show the cables 130, 132 extending between the trolling motor mount 118 and a control head 114. Other examples could have the cables 130, 132 extending between different components or simply extend into an end of the shaft 110 and the trolling motor could have a control head remote from and not attached to shaft 110.

Figure 13:
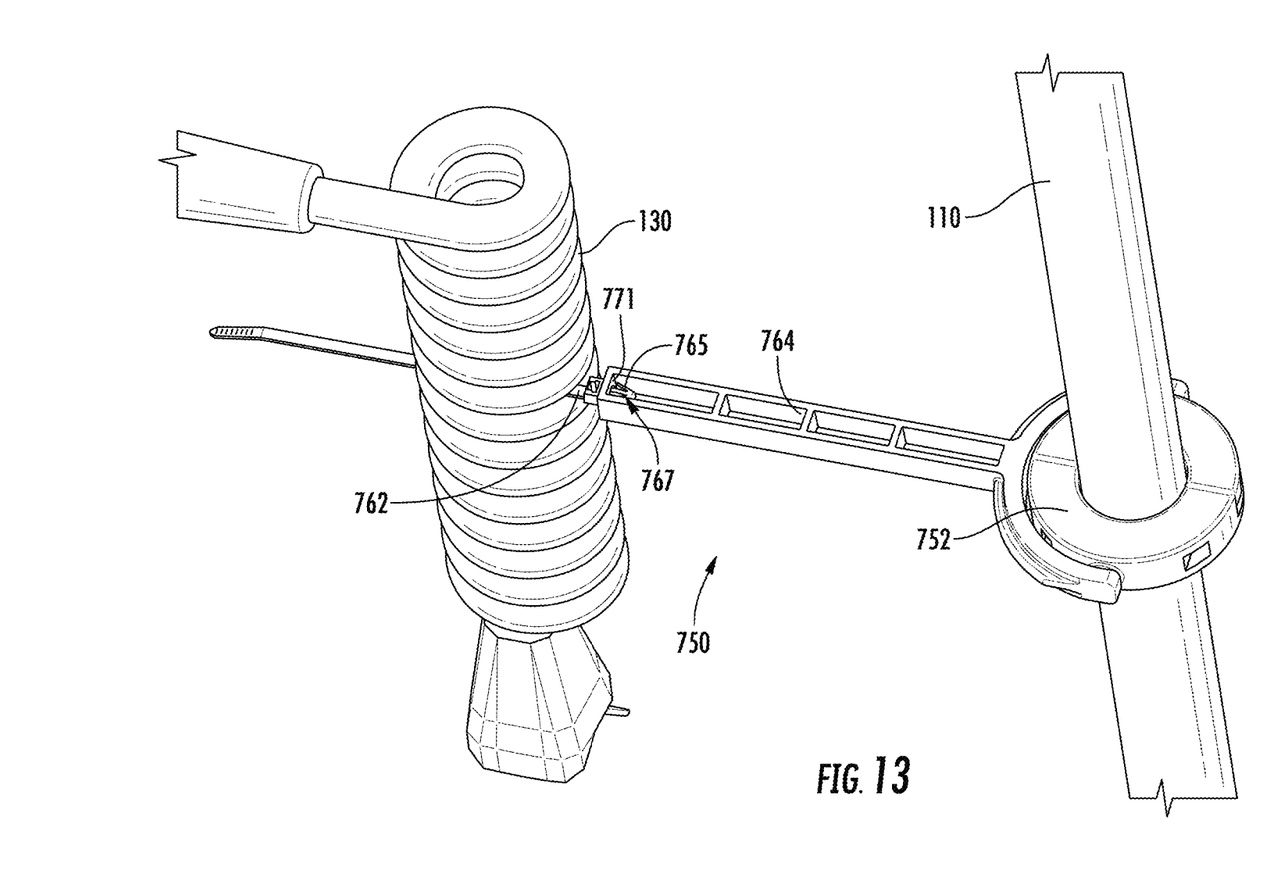
FIGS. 13 and 14 illustrate an alternative embodiment of a cable management device useable in the trolling motor of FIG. 1.
Figure 14:
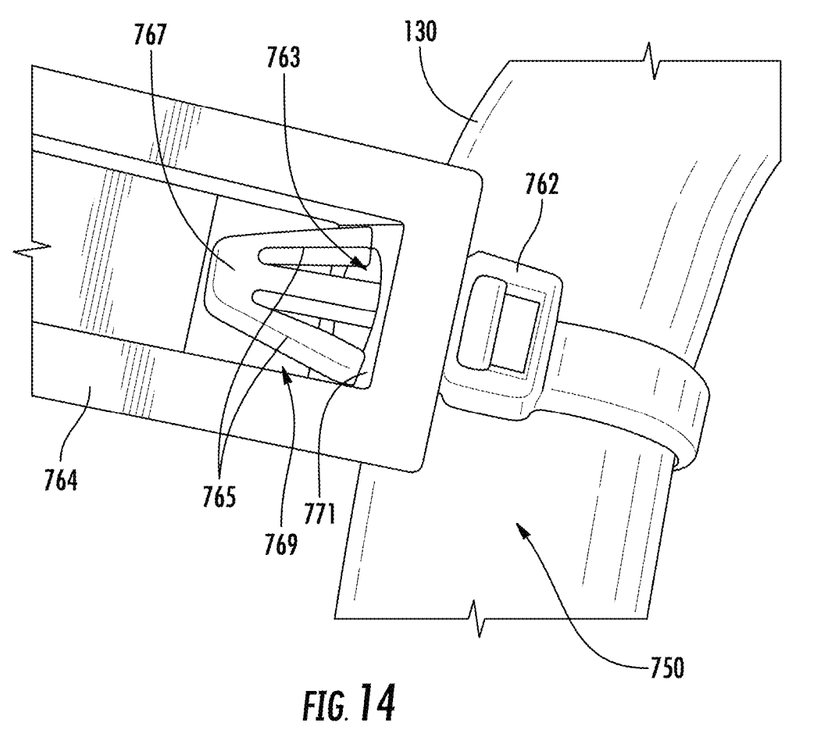

FIGS. 13 and 14 illustrate a further embodiment of a cable management device 750. This cable management device includes a mounting base 752 similar to that of prior embodiments, such as mounting base 152 described previously. Further, the cable management device 750 includes an arm 764 that is pivotally mounted to mounting base 752 similar to arm 164.

This embodiment utilizes a cable connector in the form of a cable tie 762. Similar to discussed above, the cable tie 762 is a push mount cable tie that includes a push mount 767 that can be resiliently manipulated such that it can be pushed through aperture 763 in the end of arm 764. Once sufficiently inserted through aperture 763, the push mount 767 can resiliently expand (i.e. return to its original shape) and prevent removal of the push mount 767 from aperture 763.

In this example, the push mount 767 includes a pair of flexile fingers 765 that can be resiliently compressed (e.g. pressed towards one another) as the push mount is inserted through aperture 763. Once sufficiently inserted into relief zone 769, the fingers 765 are permitted to return to or towards their undeformed state such that ends thereof abut abutment wall 771. As such, if force is applied to remove the push mount 767 from arm 764 and through aperture 763, the ends of the fingers 765 will engage abutment wall 771 and prevent removal.

The cable tie is shown in an unattached state relative to cable 130 in FIG. 13 and shown attached, e.g. wrapped around cable 130 and then trimmed to length, in FIG. 14.

While a push mount 767 using flexible fingers 765 is illustrated, other push mounts, such as a fir tree design could be incorporated. Notably, the push mount 767 is configured to permit rotation of the push mount 767 within aperture 763 to provide the additional degree of freedom between the cable tie 762 and the arm 764.

The push mount 767 may be unitarily formed with the strap portion of the cable tie 762 or separately formed and then attached to the strap portion of the cable tie 762.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A trolling motor comprising:
   a trolling motor mount;
   a shaft carried by the trolling motor mount, the shaft extending axially between first and second ends, the shaft being adjustably positionable relative to the trolling motor mount along a shaft axis;
   a propulsion unit attached to the first end of the shaft;
   at least one cable attached proximate the second end of the shaft; and
   a cable management device comprising:
      a mounting base configured to slidably attach to the shaft for movement along the shaft; and
      a cable attachment operably connected to the mounting base, the cable attachment being configured to attach to the at least one cable, the cable attachment being laterally offset from the mounting base and spaced away from the shaft axis;
   wherein the cable management device is mounted between the second end of the shaft and the trolling motor mount, the mounting base slidable along the shaft to adjust a position of the mounting base between the second end and the trolling motor mount, the cable attachment attached to the at least one cable.

2. The trolling motor of claim 1, wherein the mounting base is configured to rotate around the shaft when mounted to the shaft such that the mounting base has at least two degrees of freedom relative to the shaft.

3. The trolling motor of claim 2, wherein the cable attachment is connected to the mounting base for pivotal movement about a second axis that is generally perpendicular to the first axis to provide a third degree of freedom to the cable attachment relative to the axis.

4. The trolling motor of claim 1, wherein the mounting base is a rigid support ring that defines an aperture through which the shaft extends and the cable attachment includes an arm extending between a mounting end that is connected to the mounting base and an attachment end that includes a cable connector through which the at least one cable extends to attach the cable attachment to the at least one cable.

5. The trolling motor of claim 4, wherein:
   the support ring can slide axially along the shaft and rotate about the shaft;
   the arm is pivotally connected to the mounting base about a second axis that is generally perpendicular to the shaft axis; and
   the cable connector can rotate relative to the arm about a clip axis of rotation.

6. The trolling motor of claim 5, wherein the clip axis of rotation is perpendicular to the second axis.

7. The trolling motor of claim 6, wherein the mounting end includes a yoke that is pivotably attached to the mounting base on opposed sides of the mounting base.

8. The trolling motor of claim 1, wherein the cable attachment includes a clip that extends completely around the at least one cable.

9. The trolling motor of claim 1, wherein the cable management device spaces at least a region of the at least one cable from the shaft.

10. The trolling motor of claim 1, wherein the mounting base of the cable management device is rotatable relative to the shaft about the shaft axis.

11. The trolling motor of claim 10, wherein the cable attachment is pivotable relative to the shaft and the mounting base about a second axis that is perpendicular to the shaft axis.

12. The trolling motor of claim 11, wherein the cable attachment includes an arm extending between a mounting end that is connected to the mounting base and an attachment end that is operably attached to the at least one cable such that the at least one cable is fixed relative to the attachment end when the mounting base moves axially along the shaft.

13. The trolling motor of claim 1, wherein the shaft is axially slidable along the shaft axis at least 40 inches and the mounting base is axially slidable at least 20 inches along the shaft axis.

14. The trolling motor of claim 1, wherein the at least one cable includes at least one coiled cable and at least one uncoiled cable, the cable attachment directly connected to the at least one coiled cable, the at least one uncoiled cable, or both the at least one coiled cable and the at least one uncoiled cable.

15. The trolling motor of claim 1, wherein the trolling motor mount includes a steering mechanism, the steering mechanism configured to rotate the shaft about the shaft axis, the shaft being axially slidable relative to the steering mechanism.

16. A method of managing at least one cable of a trolling motor, comprising:
   axially sliding a cable management device slidably mounted to a shaft of the trolling motor along the shaft of the trolling motor while axially translating the shaft of the trolling motor relative to a trolling motor mount along a shaft axis, the trolling motor mount carrying the shaft, the shaft extending axially between first and second ends, a propulsion unit being attached to the first end of the shaft, the trolling motor including at least one cable attached proximate the second end of the shaft, the cable management device including a mounting base attaching the cable management device to the shaft between the second end and the trolling motor mount for movement along the shaft, the cable management device being attached to the at least one cable of the trolling motor with a cable attachment of the cable management device at a location between and spaced away from ends of the at least one cable, the cable attachment being laterally offset from and operably connected to the mounting base and spaced away from the shaft axis;
   wherein axially sliding the cable management device adjusts a position of the mounting base between the second end and the trolling motor mount; and
   wherein axially sliding the cable management device along the shaft of the trolling motor axially translates a portion of the at least one cable axially relative to the shaft with the cable management device.

17. The method of claim 16, further comprising rotating the cable management device about the shaft of the trolling motor, wherein rotating the cable management device about the shaft of the motor rotates the portion of the at least one cable angularly about the shaft.

18. The method of claim 16, further comprising pivoting an arm of the cable management device relative to a mounting base of the cable management device about an axis that is generally perpendicular to the shaft of the trolling motor by translating the shaft of the trolling motor relative to the trolling motor mount.

* * * * *